United States Patent Office 3,840,594
Patented Oct. 8, 1974

3,840,594
PROCESS FOR PREPARING MESITYLENIC ACID
Anatoli Onopchenko, Monroeville, and Johann G. D. Schulz, Pittsburgh, Pa., assignors to Gulf Research & Development Company, Pittsburgh, Pa.
No Drawing. Filed Dec. 18, 1972, Ser. No. 316,265
Int. Cl. C07c 51/16, 63/32
U.S. Cl. 260—524 R  11 Claims

ABSTRACT OF THE DISCLOSURE

A process for converting mesitylene to mesitylenic acid which comprises subjecting mesitylene to reaction with a gas containing molecular oxygen in a lower carboxylic acid in the presence of a cobalt compound soluble in the reaction mixture.

---

This invention relates to a process for converting mesitylene to mesitylenic acid in high yields.

Processes for converting mesitylene to oxidation products thereof are known, but, unfortunately, since mesitylene is highly reactive selectivity to mesitylenic acid is low and large amounts of uvitic acid, trimesic acid and carbonyl and hydroxyl products are obtained. For example, Lopaeva et al. in *Neftekhimiya*, 10, No. 6, pages 875 to 878, November-December 1970 (Ural Polytechnic Institute) and also in *Neftekhimiya*, 10, No. 5, pages 689 to 692, September-October 1970, subjected mesitylene to oxidation with air, but without solvent, in the presence of cobalt stearate tetrahydrate at a temperature of 135° to 140° C. and obtained a product containing carbonyl and hydroxyl compounds and only 30 percent by weight of mesitylenic acid. Saffer in U.S. Pat. No. 2,833,816 subjected mesitylene to oxidation with molecular oxygen in acetic acid in the presence of a cobalt salt and bromine at elevated temperatures and obtains high yields of trimesic acid. Hull in U.S. Pat. No. 2,673,217 subjected mesitylene to oxidation with oxygen in the presence of cobalt and a large amount of acetaldehyde and obtains uvitic acid as product.

We have found, unexpectedly, that mesitylene can be converted to mesitylenic acid in high yields by a process which comprises subjecting mesitylene to reaction with a gas containing molecular oxygen in a lower carboxylic acid in the presence of a cobalt compound soluble in the reaction mixture. The only remaining product obtained is uvitic acid. Operating under our preferred embodiment we can obtain a product consisting almost solely of mesitylenic acid.

The components required in the reaction mixture are the following: mesitylene, a gas containing molecular oxygen, a lower carboxylic acid and a cobalt compound soluble in the reaction mixture.

In the process defined therein any gas containing molecular oxygen, such as oxygen itself or air, can be used. The amount of oxygen used is at least the amount stoichiometrically required to convert mesitylene to mesitylenic acid. It is, however, preferable to use amounts in excess of those amounts stoichiometrically required, for example, from about two to aboutt 20 molar excess.

The lower carboxylic acid used will preferably have from two to four carbon atoms, such as acetic acid, propionic acid and normal butyric acid. Of these, we prefer to use acetic acid. The amount of lower carboxylic acid used can be varied over a wide range, as long as a substantially homogeneous liquid phase is present during the reaction. Thus, the initial weight ratio of lower carboxylic acid to mesitylene can be from about 1:10 to about 20:1. We have found, however, that when the initial weight ratio of lower carboxylic acid to mesitylene is in the range of about 1:1 to about 1:5, conversion of mesitylene is somewhat reduced but selectivity to mesitylenic acid rises to above about 90 weight per cent and in some cases substantially quantitative yields of mesitylenic acid are obtained.

Cobalt can be used in the form of any compound, preferably a salt, soluble in the reaction mixture. Thus, the cobalt compound can be inorganic or organic, for example, a cobaltous or cobaltic chloride, sulfate, nitrate, acetate, propionate, butyrate, isovalerate, benzoate, toluate, naphthenate, salicylate, acetyl acetonate, etc. Of these, we prefer to employ cobaltous or cobaltic acetate. The amount of cobalt compound employed can vary over a broad range corresponding, for example, to at least about 0.1 and as high as about five, or even higher, per cent by weight of cobalt, based on the lower carboxylic acid, although we prefer to employ from about one to about two per cent by weight of cobalt. Cobalt in amounts in excess of about three percent, or even five per cent, can be used, but are not needed, since increased conversions and selectivity are not obtained.

The reaction defined herein is preferably carried out in the absence of a promotor. Although higher conversions of mesitylene may be obtained when an initiator is used, selectivity to desired mesitylenic acid may be reduced somewhat. If a promotor is used, it is present in an amount that can range from about 0.1 to about 50 percent by weight, preferably from about 1.0 to about 5.0 percent by weight, based on the reaction mixture. Examples of such promotors are aldehydes or ketones such as acetaldehyde, methyl ethyl ketone, cyclohexanone or their hydrocarbon precursors.

The reaction temperature can be as low as about 80° C. or as high as about 160° C., or even higher, but generally a temperature in the range of about 95° to about 140 C. is satisfactory. Pressures do not appreciably affect the course of the reaction and can be in the range, for example, from about atmospheric to about 5000 pounds per square inch gauge, preferably in the range of about 50 to about 500 pounds per square inch gauge. Reaction time can also vary over a wide range, with the shortest reaction times being at the higher reaction temperatures, but in general the reaction time will be in the range of about five minutes to about 10 hours, preferably in the range of about 15 minutes to about three hours.

At the end of the reaction period the desired mesitylene can be recovered from the reaction mixture in any convenient manner. For example, after cooling and depressuring, the contents of the reaction vessel are diluted with an equal volume of cold water and then filtered to recover the precipitated solids therefrom. The recovered solids consist of mesitylenic acid and/or uvitic acid, if present, along with unreacted mesitylene. The solids can be washed with water to remove traces of cobalt and lower carboxylic acid therefrom. If unreacted mesitylene is present it can be removed by washing the solids with hexane. The remaining solids can then be dried to remove moisture therefrom. The filtrate contains the bulk of the lower carboxylic acid solvent and cobalt compound used and water of reaction. The water can be removed from the filtrate by simple distillation or evaporation, leaving behind the lower carboxylic acid and cobalt compound which can be reused to oxidize additional mesitylene as defined herein.

The process herein can further be defined by the following series of runs. A mixture consisting of cobalt acetate tetrahydrate, acetic acid, when used, and mesitylene was charged into a one-liter, 316-stainless steel, magnetically-stirred autoclave. The autoclave was pressured with oxygen and heated to reaction temperature. Additional oxygen was then introduced into the autoclave to obtain the reaction pressure. The reaction was then permitted to continue until oxygen absorption substantially ceased. The autoclave was then cooled to room temperature, depressured and the product mixture removed from the autoclave. The reaction mixture so obtained was diluted with about an equal volume of cold water and filtered to recover the precipitated solids therein. The precipitated solids were washed with water to remove traces of cobalt and acetic acid and then with hexane to remove unreacted mesitylene. The recovered product was dried in an oven at 100° C., after which analysis thereof was made. The results are tabulated below in Table I.

cent by weight of cobalt catalyst, as cobalt, is used. Amounts in excess thereof do not appreciably affect the conversion of mesitylene nor the selectivity to mesitylenic acid.

Another series of experiments was carried out to show the effect of temperature on the product distribution. The results are tabulated below in Table III. Experiments Nos. 18 and 19 in Table III are, respectively, Experiments Nos. 5 and 6 in Table I.

TABLE I

| Experiment number | 1 | 2 | 3 | 4 | 5 | 6 | 7 | 8 | 9 | 10 | 11 | 12 |
|---|---|---|---|---|---|---|---|---|---|---|---|---|
| Reactor contents, grams: | | | | | | | | | | | | |
| Acetic acid | 158 | 150 | 150 | 150 | 150 | 150 | 483 | 483 | 150 | 150 | 150 | None |
| Mesitylene | 302 | 250 | 250 | 250 | 125 | 125 | 60.5 | 60.5 | 250 | 250 | 250 | 400 |
| Cobaltous acetate tetrahydrate | 7.5 | 7.5 | 7.5 | 7.5 | 7.5 | 7.5 | 20.0 | 20.0 | 7.5 | 7.5 | 7.5 | 20 |
| Weight percent catalyst as cobalt metal based on acetic acid | 1.2 | 1.2 | 1.2 | 1.2 | 1.2 | 1.2 | 1.0 | 1.0 | 1.2 | 1.2 | 1.2 | 1.2 |
| Initial weight ratio of acetic acid to mesitylene | 0.52 | 0.60 | 0.60 | 0.60 | 1.20 | 1.20 | 8.0 | 8.0 | 0.60 | 0.60 | 0.60 | 0 |
| Reaction conditions: | | | | | | | | | | | | |
| Temperature, °C | 104 | 104 | 104 | 104 | 104 | 104 | 104 | 104 | 104 | 104 | 160 | 104 |
| Pressure, p.s.i.g | 300 | 300 | 300 | 300 | 300 | 300 | 300 | 300 | 100 | 100 | 300 | 300 |
| Reaction time, hours | 2.0 | 2.0 | 2.0 | 2.0 | 2.0 | 2.0 | 2.0 | 2.0 | 2.5 | 2.0 | [1]1.5 | 2.0 |
| Products, grams: | | | | | | | | | | | | |
| Mesitylenic acid | 88.0 | 94.2 | 99.0 | 90.0 | 71.0 | 68.3 | 34.4 | 38.9 | 88.7 | 80.0 | 111.4 | Nil |
| Uvitic acid | Nil | 3.6 | 6.0 | 5.0 | 21.0 | 15.7 | 30.6 | 26.1 | Nil | Nil | 10.4 | Nil |
| Conversion data: | | | | | | | | | | | | |
| Selectivity to mesitylenic acid, percent by weight | 99+ | 96.3 | 94.3 | 95.0 | 77.2 | 81.2 | 53.0 | 60.0 | 99+ | 99+ | 91.5 | Nil |
| Mesitylene conversion, percent | 23.0 | 30.0 | 31.0 | 34.0 | 57.0 | 52.0 | 80.0 | 80.0 | 28.4 | 25.7 | 38.4 | Nil |

[1] Oxygen absorption ceased at the end of 40 minutes; maintained at reaction temperature for additional 50 minutes.

The above data clearly show that when mesitylene is subjected to oxidation under the conditions defined herein excellent selectivities to mesitylenic acid are obtained. Experiments 1, 2, 3, 4, 9, 10 and 11 show that when the initial weight ratio of acetic acid to mesitylene is within the preferred range, even at the relatively high temperature of 160° C., selectivity is almost solely to mesitylenic acid. A comparison of Experiment Nos. 9 and 10 with Experiment Nos. 2, 3 and 4 shows that pressure does not affect the course of the reaction appreciably. Lower pressures result in slightly lower conversions but somewhat higher selectivity to mesitylenic acid. Experiment No. 12 shows that a lower carboxylic acid must be present in the process defined herein.

An additional series of experiments was carried out as in Table I, but at different cobalt catalyst concentrations. The data obtained are tabulated below in Table II. Experiment No. 15 in Table II is Experiment No. 2 in Table I.

TABLE II

| Experiment number | 13 | 14 | 15 | 16 |
|---|---|---|---|---|
| Reactor contents, grams: | | | | |
| Acetic acid | 150 | 150 | 150 | 150 |
| Mesitylene | 250 | 250 | 250 | 250 |
| Cobaltous acid tetrahydrate | 3.0 | 6.0 | 7.5 | 23.3 |
| Weight percent catalyst as cobalt metal based on acetic acid | 0.5 | 0.9 | 1.2 | 3.7 |
| Initial weight ratio of acetic acid to mesitylene | 0.60 | 0.60 | 0.60 | 0.60 |
| Reactor conditions: | | | | |
| Temperature °, C | 104 | 104 | 104 | 104 |
| Pressure, pounds per square inch gauge | 300 | 300 | 300 | 300 |
| Reaction time, hours | 2.0 | 2.0 | 2.0 | 2.0 |
| Products, grams: | | | | |
| Mesitylenic acid | 17.4 | 70.2 | 94.2 | 94.2 |
| Uvitic acid | Nil | 0.8 | 3.6 | 5.3 |
| Conversion data: | | | | |
| Selectivity to mesitylenic acid, percent by weight | 99+ | 98.4 | 96.3 | 94.7 |
| Mesitylene conversion, percent | 7.0 | 23.0 | 30 | 32 |

Table II shows that excellent selectivity to mesitylenic acid is obtained over a wide range of catalyst concentrations. Increasing the amount of cobalt merely increases the amount of conversion obtained until about 1.5 per-

TABLE III

| Experiment number | 17 | 18 | 19 | 20 | 21 | 22 |
|---|---|---|---|---|---|---|
| Reactor contents, grams: | | | | | | |
| Acetic acid | 150 | 150 | 150 | 150 | 150 | 150 |
| Mesitylene | 125 | 125 | 125 | 125 | 125 | 125 |
| Cobaltous acetate tetrahydrate | 7.5 | 7.5 | 7.5 | 7.5 | 7.5 | 7.5 |
| Weight percent catalyst as cobalt metal based on acetic acid | 1.2 | 1.2 | 1.2 | 1.2 | 1.2 | 1.2 |
| Initial weight ratio of acetic acid to mesitylene | 1.2 | 1.2 | 1.2 | 1.2 | 1.2 | 1.2 |
| Reaction conditions: | | | | | | |
| Temperature, °C | 93 | 104 | 104 | 120 | 140 | 160 |
| Pressure, pounds per square inch gauge | 300 | 300 | 300 | 300 | 300 | 300 |
| Reaction time, hours | 2.0 | 2.0 | 2.0 | 1.7 | 1.25 | 0.55 |
| Product, grams: | | | | | | |
| Mesitylenic acid | 69.9 | 71.0 | 68.3 | 73.4 | 69.5 | 64.5 |
| Uvitic acid | 23.6 | 21.0 | 15.7 | 14.3 | 23.2 | 19.5 |
| Conversion data: | | | | | | |
| Selectivity to mesitylenic acid, percent by weight | 74.8 | 77.2 | 81.2 | 82.5 | 75.0 | 77.1 |
| Mesitylene conversion, percent | 57.0 | 57.0 | 52.0 | 54.0 | 53.0 | 51.7 |

From Table III it can be seen that over a wide temperature range mesitylene conversion and selectivity to mesitylenic acid remains at approximately the same level.

Obviously, many modifications and variations of the invention, as hereinabove set forth, can be made without departing from the spirit and scope thereof, and therefore only such limitations should be imposed as are indicated in the appended claims.

We claim:

1. A process for converting mesitylene to mesitylenic acid in high selectivities which comprises subjecting mesitylene to reaction with a gas containing molecular oxygen in a lower carboxylic acid at a temperature of about 80° to about 160° C. solely in the presence of a cobalt compound soluble in the reaction mixture.

2. The process of claim 1 wherein the lower carboxylic acid has from two to four carbon atoms.

3. The process of claim 1 wherein the lower carboxylic acid is acetic acid.

4. The process of claim 1 wherein the initial weight ratio of said lower carboxylic acid to mesitylene is in the range of about 1:10 to about 20:1.

5. The process of claim 1 wherein the initial weight ratio of said lower carboxylic acid to mesitylene is in the range of about 1:1 to about 1:5.

6. The process of claim 1 wherein the reaction temperature is in the range of about 95° to about 140° C.

7. The process of claim 1 wherein the cobalt compound is cobalt acetate.

8. The process of claim 1 wherein the amount of cobalt compound employed, as cobalt, is in the range of about 0.1 to about five weight percent by weight based on the lower carboxylic acid.

9. The process of claim 1 wherein the amount of cobalt compound employed, as cobalt, is in the range of about one to about two percent by weight based on the lower carboxylic acid.

10. The process of claim 1 wherein the lower carboxylic acid has from one to four carbon atoms, the initial weight ratio of said lower carboxylic acid to mesitylene is in the range of about 1:10 to about 20:1 and the amount of cobalt compound employed, as cobalt, is in the range of about 0.1 to about five weight percent based on the lower carboxylic acid.

11. The process of claim 1 wherein the lower carboxylic acid is acetic acid, the initial weight ratio of acetic acid to mesitylene is in the range of about 1:1 to about 1:5, the temperature is in the range of about 95° to about 140° C., the cobalt compound is cobalt acetate and the amount of cobalt acetate employed, as cobalt, is in the range of about one to about two percent by weight based on the acetic acid.

References Cited
UNITED STATES PATENTS

| | | | |
|---|---|---|---|
| 2,245,528 | 6/1941 | Loder | 260—52 X |
| 2,892,868 | 6/1959 | Lederle et al. | 260—524 R |

LORRAINE A. WEINBERGER, Primary Examiner

R. D. KELLY, Assistant Examiner